United States Patent [19]

Tamai et al.

[11] Patent Number: 5,346,982

[45] Date of Patent: Sep. 13, 1994

[54] HEAT-RESISTANT ADHESIVE

[75] Inventors: Shoji Tamai, Yokohama; Katsuaki Iiyama; Akihiro Yamaguchi, both of Kanagawa, all of Japan

[73] Assignee: Mitsui Toatsu Chemicals, Incorporated, Tokyo, Japan

[21] Appl. No.: 72,691

[22] Filed: Jun. 7, 1993

Related U.S. Application Data

[63] Continuation of Ser. No. 833,161, Feb. 10, 1992, abandoned.

[30] Foreign Application Priority Data

Feb. 21, 1991 [JP] Japan .................. 3-027406

[51] Int. Cl.⁵ .................. C08G 73/10; C08G 69/26
[52] U.S. Cl. .................. 528/183; 528/125; 528/128; 528/170; 528/172; 528/173; 528/176; 528/185; 528/188; 528/220; 528/229; 528/350; 528/353; 526/935
[58] Field of Search .............. 528/183, 125, 128, 170, 528/172, 173, 176, 185, 188, 220, 229, 350, 353; 526/935

[56] References Cited

U.S. PATENT DOCUMENTS 4,065,345 12/1977 Progar et al. ............ 156/309
5,087,689 2/1992 Ohta et al. ............ 528/185

FOREIGN PATENT DOCUMENTS 235294 9/1987 European Pat. Off. .
243507 11/1987 European Pat. Off. .
276922 8/1988 European Pat. Off. .
367482 5/1990 European Pat. Off. .
387450 9/1990 European Pat. Off. .
391633 10/1990 European Pat. Off. .
441013 8/1991 European Pat. Off. .
61-291670 12/1986 Japan .
1-96221 4/1989 Japan .

*Primary Examiner*—John Kight, III
*Assistant Examiner*—P. Hampton-Hightower
*Attorney, Agent, or Firm*—Burns, Doane, Swecker & Mathis

[57] ABSTRACT

A polyimide-based heat-resistant adhesive having excellent peel strength and heat resistance comprising polyimide composed of 10 to 99% by mole of structural units having the formula (1) and 1 to 90% by mole of structural units having the formula (2) or comprising polyamic acid precursor which corresponds to the polyimide.

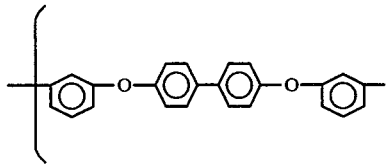

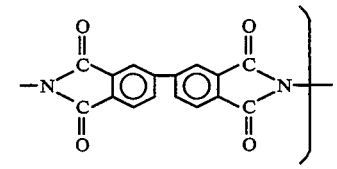

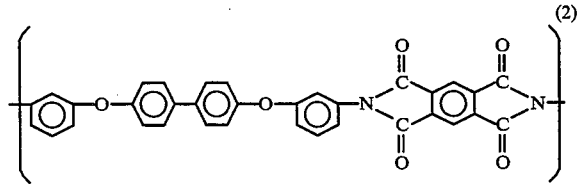

6 Claims, 1 Drawing Sheet

HEAT-RESISTANT ADHESIVE

This application is a continuation of application Ser. No. 07/833,161, filed Feb. 10, 1992, now abandoned.

BACKGROUND OF THE INVENTION

1. Field of the Invention

The present invention relates to a heat-resistant adhesive and particularly relates to a high-heat-resistant adhesive having an excellent peel strength.

2. Prior Art of the Invention

Various organic high polymers have conventionally been known for use in adhesives. Excellent heat-resistant adhesives which have been developed are based on polybenzimidazole and polyimide. Particularly, adhesives which can be used for high-temperature-resistant polyimide-based films are based on the above adhesives and are additionally based on fluororesin, polyamidimide, silicone, epoxy novolak, epoxy acryl, nitrile-rubber phenol, and polyester.

However, these adhesives which have sufficient heat-resistance are inferior in adhesive strength. On the other hand, those having an excellent adhesive strength are inferior in heat resistance. Thus properties of these adhesives are unsatisfactory.

Heat resistant adhesives which are excellent in bath high-temperature resistance and adhesive strength have been disclosed in U.S. Pat. No. 4,065,345 and Japanese Laid-Open Patent SHO 61-291670(1986). These adhesives, however, are examples having excellent tensile shear adhesive strength and do not relate to examples of heat-resistant adhesives having excellent peel strength.

SUMMARY OF THE INVENTION

One object of the invention is to provide a novel adhesive which has high heat-resistance and excellent peel strength and can maintain adhesive force during use even at high temperatures.

As a result of an intensive investigation in order to accomplish the above object, the present inventors have found that polyimide obtained by reacting 4,4-bis(3-aminophenoxy)biphenyl as an aromatic diamine component with a mixture of 3,3', 4,4'-biphenyltetracarboxylic dianhydride and pyromellitic dianhydride as an aromatic tetracarboxylic acid dianhydride component can exhibit high heat-resistance and excellent peel strength. Thus, the present invention has been completed.

That is, the aspect of the present invention is a heat-resistant adhesive essentially consisting of a polyimide which comprises in the polymer molecule from 10 to 99% by mole of structural units having the formula (1):

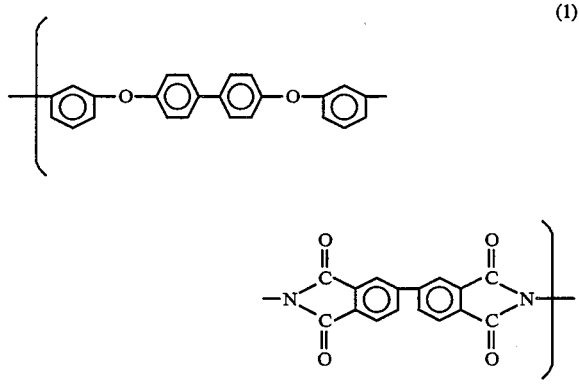

and from 1 to 90% by mole of structural units having the formula (2):

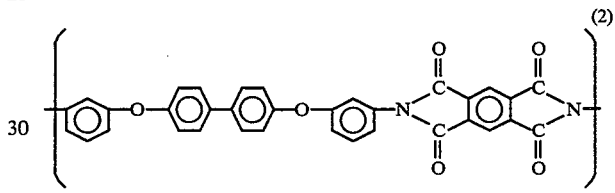

Another aspect of the present invention is a heat-resistant adhesive essentially consisting of a varnish comprising the polyimide molecule.

A further aspect of the present invention is a heat-resistant adhesive essentially consisting of a polyimide obtained by thermally or chemically imidizing a polyamic acid, i.e., the precursor of polyimide, which comprises in the polymer molecule from 10 to 99% by mole of structural units having the formula (3):

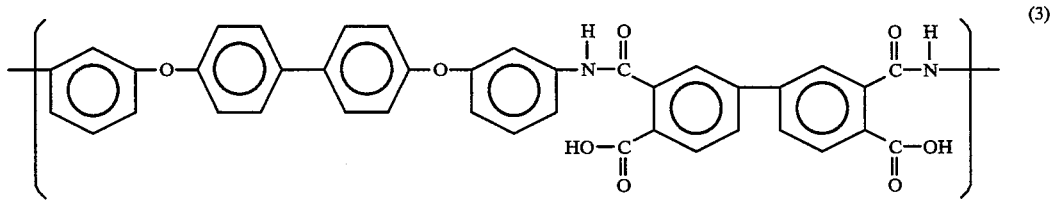

and from 1 to 90% by mole of structural units having the formula (4):

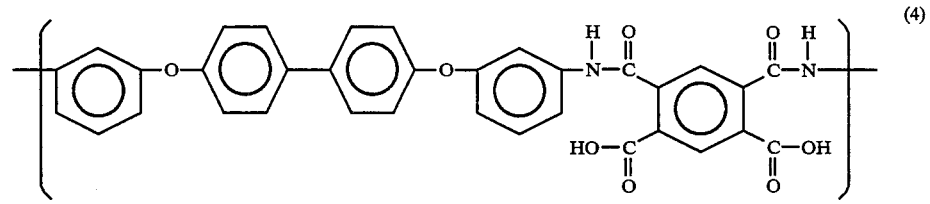

and has an inherent viscosity of from 0.1 to 3.0 dl/g which is measured at 35° C. by dissolving said polyamic acid in N,N-dimethylacetamide to a concentration of 0.5 g/100 ml.

A still further aspect of the present invention is a heat resistant adhesive essentially consisting of a varnish comprising said polyamic acid.

The heat resistant adhesive of the invention is characterized by using 4,4'-bis(3-aminophenoxy)biphenyl as an aromatic diamine component and pyromellitic dianhydride and 3,3', 4,4'-biphenyltetracarboxylic dianhydride as tetracarboxylic acid dianhydride components, and is particularly excellent in adhesive peel strength and heat resistance.

Polyimide prepared by using 4,4'-bis(3-aminophenoxy)biphenyl as an aromatic diamine component has already been disclosed as an high-heat-resistant thermoplastic polymer in U.S. Pat. No. 4,847,349. However, it has not been known at all that the polyimide obtained by reacting 4,4'-bis(3-aminophenoxy)biphenyl with a mixture of 3,3', 4,4'-biphenyltetracarboxylic dianhydride and pyromellitic dianhydride has particularly high-heat-resistance adhesive and high peel strength. The fact is disclosed first of all by the present invention.

DETAILED DESCRIPTION OF THE INVENTION

Figure 1:
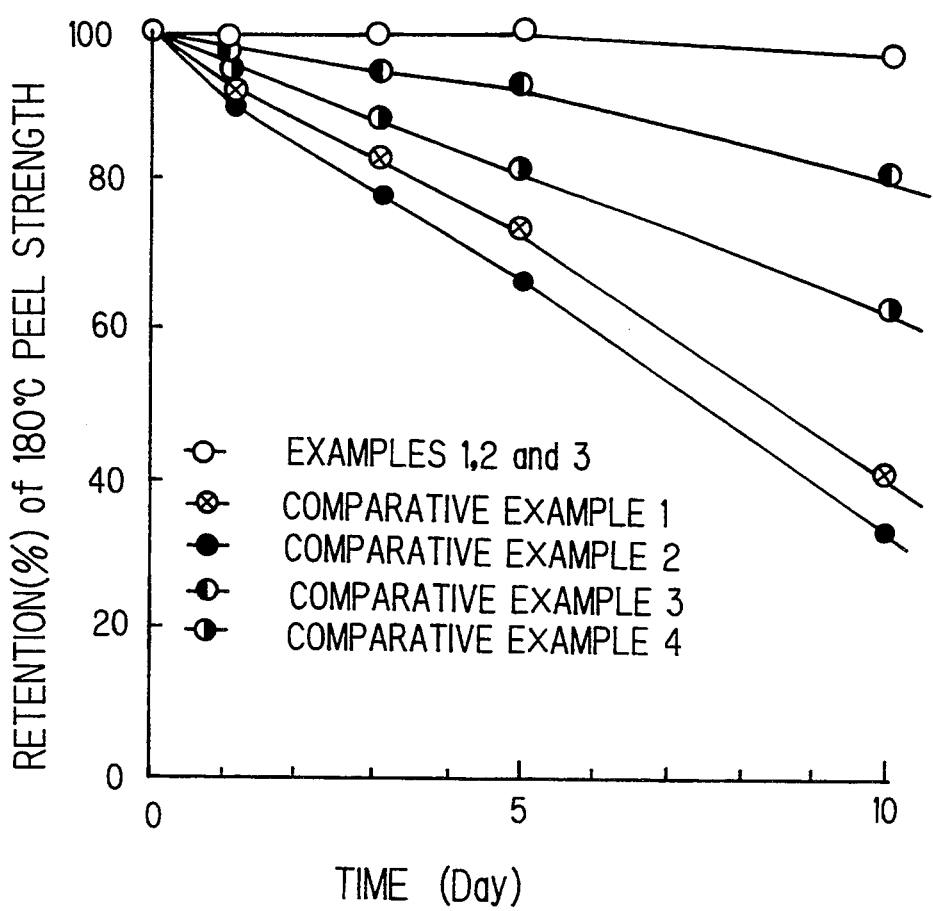
FIG. 1 illustrates adhesive properties of polyamic acid obtained in Examples and Comparative Examples by variation of 180° peel strength with time.

The polyimide or polyamic acid in the heat-resistant adhesive of the invention is prepared by the process described below.

The aromatic diamine component used for the preparation of the polyimide or polyamic acid is 4,4'-bis(3-aminophenoxy)biphenyl having the formula (5):

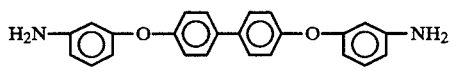

(5)

The aromatic tetracarboxylic acid component for use in the present invention is 4,4'-biphenyltetracarboxylic dianhydride having the formula ( 6 ):

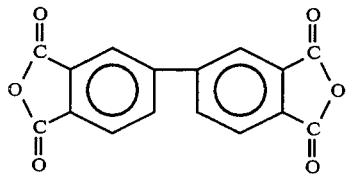

(6)

and pyromellitic dianhydride having the formula (7):

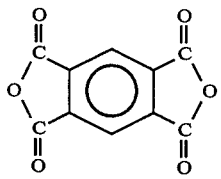

(7)

The two aromatic tetracarboxylic dianhydrides are used as a mixture.

The polyimide or polyamic acid as the adhesive of the present invention comprises the above aromatic diamine and aromatic tetracarboxylic acid dianhydrides as primary components. These aromatic tetracarboxylic acid dianhydrides can be partially replaced without any problem by other tetracarboxylic acid dianhydrides represented by the formula (8):

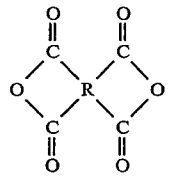

(8)

wherein R is a tetravalent radical selected from the group consisting of an aliphatic radical having two or more carbon atoms, alicyclic radical, monoaromatic radical, condensed aromatic radical and noncondensed aromatic radical connected each other with a direct bond or a bridge member, in an amount giving no adverse effect on the properties of the heat-resistant adhesive of the invention.

Other tetracarboxylic dianhydrides which can be used include, for example
ethylenetetracarboxylic dianhydride,
cyclopentanetetracarboxylic dianhydride,
3,3', 4,4'-benzophenonetetracarboxylic dianhydride,
2,2', 3,3'-benzophenonetetracarboxylic dianhydride,
2,2', 4,4'-biphenyltetracarboxylic dianhydride,
2,2'-bis(3,4-dicarboxyphenyl)propane dianhydride,
bis(3,4-dicarboxyphenyl)ether dianhydride,
bis(3,4-dicarboxyphenyl) sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.

Further, it has been well known that polymer end blocking or molecular weight control can be carried out by simultaneously using an aromatic dicarboxylic acid dianhydride represented by the formula (9):

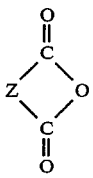

(9)

wherein Z is a divalent radical selected from the group consisting of a monoaromatic radical, condensed aromatic radical and noncondensed aromatic radical connected to each other with a direct bond or a bridge member, or an aromatic monoamine represented by the formula (10):

Z—NH₂    (10)

wherein Z is a divalent radical selected from the group consisting of a monoaromatic radical, condensed aromatic radical and noncondensed aromatic radical connected to each other with a direct bond or a bridge member. The method can also be applied without any problem to the process of the invention.

Exemplary dicarboxylic acid anhydrides which can be used in the process include
phthalic anhydride,
2,3-benzophenonedicarboxylic anhydride,
3,4-benzophenonedicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
1,2-naphthalenedicarboxylic anhydride,
1,8-naphthalenedicarboxylic anhydride,
1,2-anthracenedicarboxylic anhydride,
2,3-anthracenedicarboxylic anhydride and
1,9-anthracenedicarboxylic anhydride.

These dicarboxylic acid anhydrides may be substituted with a radical having no reactivity with amine or dicarboxylic acid anhydride.

Exemplary aromatic monoamines which can be used in the process include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-1-naphthol, 8-amino-2-naphthol, 1-amino-anthracene, 2-aminoanthracene and 9-aminoanthracene.

These aromatic monoamines may be substituted with a radical having no reactivity with amine or dicarboxylic acid anhydride.

The reaction for forming polyamic acid is usually carried out in an organic solvent. Suitable organic solvents used for the reaction include, for example, N-methyl-2-pyrrolidone, N,N-dimethylacetamide, N,N-dimethylformamide, 1,3-dimethyl-2-imidazolidinone, N,N-diethylacetamide, N,N-dimethylmethoxyacetamide, dimethyl sulfoxide, pyridine, dimethyl sulfone, hexamethylphosphoramide, tetramethylurea, N-methylcaprolactam, butyrolactam, tetrahydrofuran, 1,2-dimethoxyethane, bis(2-methoxyethyl) ether, 1,2-bis(2-methoxyethoxy)ethane, bis-2(2-methoxyethoxy)ethyl ether, 1,3-dioxane, 1,4-dioxane, picoline, dimethyl sulfoxide, dimethyl sulfone, o-cresol, m-cresol, p-cresol, cresylic acid, p-chlorophenol, anisole and phenol.

The polyimide or polyamic acid used for preparing the heat-resistant adhesive of the invention is prepared as follows by using the above raw materials.

3,3′,4,4′-Biphenyltetracarboxylic dianhydride of the formula (6) is used in an amount of from 10 to 99% by mole for the amount of 4,4′-bis(3-aminophenoxy)biphenyl of the formula (5). The amount of pyromellitic dianhydride of the formula (7) is from 1 to 90% by mole for the amount of 4,4′-bis(3-aminophenoxy)biphenyl. The above aromatic diamine is reacted in the above organic solvent with the aromatic tetracarboxylic acid dianhydride in the presence or absence of the aromatic dicarboxylic acid anhydride or aromatic monoamine which is used for polymer end blocking or molecular weight control. The polyamic acid i.e., precursor of polyimide is thus obtained.

The reaction temperature is usually 60° C. or less, preferably 50° C. or less. No particular limitation is imposed upon the reaction pressure. The reaction can be satisfactorily carried out at atmospheric pressure. The reaction time differs depending upon the ratio in tetracarboxylic acid dianhydrides, i.e., the ratio of 3,3′,4,4′-biphenyltetracarboxylic dianhydride to pyromellitic dianhydride, kind of the solvent and reaction temperature. The reaction is usually carried out for a sufficient time to complete formation of polyamic acid. Reaction time of from 4 to 24 hours is usually satisfactory.

The reaction gives precursor of polyimide, i.e., polyamic acid which comprises in the polymer molecule from 10 to 99% by mole of structural units having the formula (3):

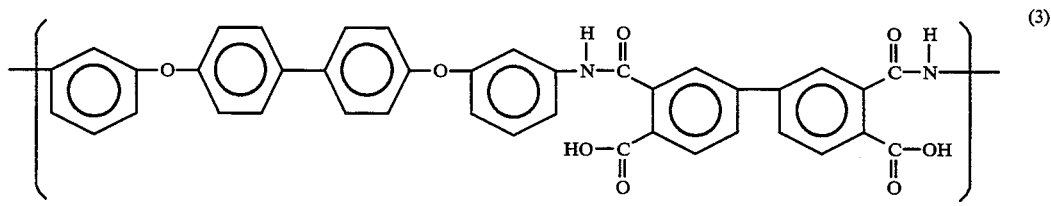

and from 1 to 90% by mole of structural units having the formula (4):

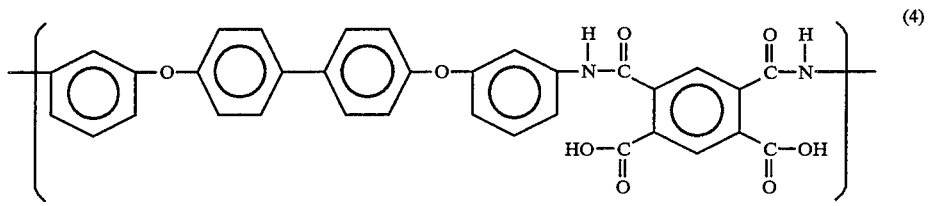

(4)

When the amount of 3,3', 4,4'-biphenyltetracarboxylic dianhydride is less than 10% by mole of the total amount of tetracarboxylic acid dianhydrides used, the resulting polyamic acid leads to low peel strength of the heat-resistant adhesive obtained. Consequently, in the mixture of 3,3', 4,4'-biphenyltetracarboxylic dianhydride and pyromellitic dianhydride, the amount of 3,3'4,4'-biphenyltetracarboxylic dianhydride must be from 10 to 99% by mole of the total amount of the tetracarboxylic acid dianhydrides. The amount from 20 to 70% by mole is preferred in particular.

An adhesive of the invention has preferred molecular weight of the polyamic acid in addition to the above structural characteristics of the polyimide or polyamic acid. The molecular weight of polyamic acid is indicated by inherent viscosity measured at 35° C. in a N,N-dimethylacetamide solution at a concentration of 0.5 g/100 ml solvent. The inherent viscosity of the polyamic acid is preferably in the range of from 0.1 to 3.0 dl/g, more preferably from 0.5 to 1.5 dl/g in view of heat resistance, adhesive strength and workability of the resulting adhesive. The molecular weight can be controlled by the mole ratio of 4,4'-bis(3-aminophenoxy)-biphenyl to the total moles of tetracarboxylic acid dianhydrides.

The adhesive of the invention can be put to practical use as a below described preparation by using the above polyamic acid. Polyimide obtained by imidizing the polyamic acid can also be provided for practical use as an adhesive. The above polyamic acid which is characterized by the structure and composition of the formulas (3) and (4) and has an inherent viscosity of from 0.1 to 3.0 dl/g at 35° C. in a N,N-dimethylacetamide solution at a concentration of 0.5 g/100 ml solvent, is thermally or chemically imidized to obtain polyimide. Imidization can be carried out by usual method, that is, by heating from 100° to 300° C. to cause dehydration/ring closure or by using an imidizing agent such as acetic anhydride to cause chemical dehydration/ring closure.

The adhesive of the invention comprising the thus-obtained polyamic acid or polyimide can be provided for practical use by the following embodiments.

(1) The heat-resistant adhesive applied is substantially composed of a varnish containing the above polyamic acid of the invention and a good solvent for the polyamic acid. The adhesive is applied to an adherend and exhibits high adhesive strength by converting polyamic acid to polyimide with a suitable procedure such as heating.

(2) Polyimide is processed into, for example, a film or powder and used as a heat-resistant adhesive which is substantially composed of the polyimide. The adhesive is attached to an adherend and successively heat-melted and pressed.

(3) The adhesive applied is substantially composed of a varnish containing the above polyimide of the invention and a good solvent for the polyimide. The adhesive is applied to an adherend, the solvent is removed by heating or other procedures, and then the adhesive is heat-melted and pressed.

In the above embodiment case (1), the term "a varnish containing the polyamic acid and a good solvent for the polyamic acid" includes a solution containing polyamic acid in an organic solvent. The reaction solvent employed in forming the polyamic acid is usually applied as intact to the solvent for dissolving the polyamic acid. Consequently, the varnish may be a liquid reaction mixture containing the polyamic acid obtained by reacting 4,4'-bis(3-aminophenoxy)biphenyl with 3,3', 4,4'-biphenyltetracarboxylic dianhydride and pyromellitic dianhydride in the organic solvent. The varnish may also be a mixture containing the polyamic acid as a main ingredient and additionally containing the polyimide formed by cyclization of the polyamic acid. Hence, the term "a solution containing polyamic acid in an organic solvent" may be a solution or a suspension partially containing polyimide.

When the varnish containing the polyamic acid is used as an adhesive, the varnish is attached in a thin layer to an adherend to be laminated and successively the attached adherend is heated at 100° to 300° C. in the air for a prescribed time to remove an excessive solvent and convert the polyamic acid to the more stable polyimide, followed by pressing under pressure of 1 to 1000 kg/cm² at temperature of 100° to 400° C. and curing at temperature of 100° to 400 °C. to firmly adhere the adherend.

The polyimide adhesive substantially consists of polyimide itself obtained by thermally or chemically carrying out dehydrating ring-closure of the polyamic acid and successively processing, for example, into a film or powder. The polyimide adhesive may partially contain the polyamic acid.

In the application of the substantially polyimide adhesive, the film or powder is inserted between the adherends, pressed under pressure of 1 to 1000 kg/mm² at temperature of 100° to 400°C. , and cured at temperature of 100° to 400° C. to firmly adhere the adherends.

Further in the above embodiment case (3), the term "a varnish containing the polyimide and a good solvent for the polyimide" includes a solution containing polyimide in an organic solvent. The reaction solvent employed in forming the polyimide is applied as intact to the solvent for dissolving the polyimide. Consequently, the varnish may be a liquid reaction mixture containing the polyimide obtained by reacting 4,4'-bis(3-aminophenoxy)biphenyl with 3,3', 4,4'-biphenyltetracarboxylic dianhydride and pyromellitic dianhydride in the organic solvent. Further, the varnish may be a solution obtained by twice dissolving a once prepared polyimide in an organic solvent. The varnish may also be a suspension containing the polyimide.

Adhesive application of the varnish containing the above polyimide can be carried out by the same procedures as in the case of the above adhesive application of varnish containing the polyamic acid.

On applying the heat-resistant adhesive of the invention, a glass fiber fabric or a carbon fiber fabric is impregnated with the adhesive by known methods and the adherends are adhered by way of the impregnated fabric. Alternatively, the adhesive is applied to the surfaces of both adherends and a glass fiber fabric or a carbon fiber fabric is inserted between the adhesive coated surfaces to conduct adhesion.

Adhesion can also be carried out after chemically or physically treating the surface of the adherend. Exemplary methods for the surface treatment include chemical etching with acid or alkali, corona discharge treatment, ultraviolet irradiation, irradiation, dry sand blasting, heat treatment, plasma treatment, polishing, wet sand blasting, plating surface oxide treatment and degreasing. These treatments can be carried out singly or in combination.

Other resins can be added to the heat-resistant adhesive of the invention in an amount giving no adverse effect on the properties of the heat-resistant adhesive. Other resins which can be added to the adhesive include, for example, various kinds of nylon, polyacetal, polycarbonate, polyphenylene oxide, polyethylene terephthalate, polysulfone, polyether sulfone, polyarylate, polyamidimide, polyetherimide, polyetheretherketone, polyimide exclusive of that of the invention, fluoro resin, polybismaleimide, and epoxy resin.

Additives can be added to the heat-resistant adhesive of the invention as long as the object of the invention is not impaired.

Exemplary additives which can be used are solid lubricants, such as molybdenum disulfide, graphite, boron nitride, lead monoxide and lead powder; reinforcements such as glass fiber, carbon fiber, aromatic polyamide fiber, potassium titanate fiber, and glass beads; and other common additives such as antioxidants, heat stabilizers, ultraviolet absorbers, flame retardants, auxiliary flame retardants, antistatics and colorants. These additives can be used singly or as a mixture.

The present invention will hereinafter be illustrated further in detail by way of examples.

EXAMPLE 1

To a reaction vessel equipped with a stirrer, reflux condenser and a nitrogen inlet tube, 36.8 g (0.1 mole) of 4,4'-bis(3-aminophenoxy)biphenyl and 137.6 g of N,N-dimethylacetamide were charged. The mixture was stirred and 16.57 g (0,076 mole) of pyromellitic dianhydride and 5.59 g (0.019 mole) of 3,3', 4,4'-biphenyltetracarboxylic dianhydride were added by portions at the room temperature in a nitrogen atmosphere with caution to prevent temperature rise of the solution. The resultant reaction mixture was stirred for about 20 hours at room temperature. The polyamic acid thus obtained had an inherent viscosity of 0.54 d l/g at 35° C. in a 5% N,N-dimethylacetamide solution.

A sheet of Kapton 200H (Trade Mark of E. I. Du Pont de Nemours & Co.) was previously washed with ethanol. The polyamic acid adhesive solution obtained above was applied to the Kapton sheet and dried by heating in the air at 150° C. for an hour and 250° C. for 5 hours. Thereafter an Inconel foil having a thickness of 20 μm was superposed upon the Kapton sheet and pressed at 350° C. for 10 minutes under pressure of 100 kg/cm$^2$.

The thickness of applied adhesive was 25 μm. The adhesive joint thus obtained had a 180° peel strength of 2.4 kg/cm at room temperature in accordance with JPCA-BM01. Variation of the 180° peel strength with time was measured by allowing the adhered specimen to stand at room temperature. FIG. 1 illustrates relationships between retention and time when the 180° peel strength of immediately after adhesion is assumed 100%. The 180° peel strength at 220° C. was 1.9 kg/cm$^2$.

Further, the above polyamic acid solution was cast on a glass plate and heated in the air individually for 2 hours at 150° C. and 250° C. to obtain a light yellow transparent polyimide film having a thickness of about 30 μm.

The polyimide film had a tensile strength of 15.6 kg/mm$^2$ and an elongation of 90% in accordance with ASTM D-882, and a glass transition temperature of 266° C. by TMA penetration method.

A pair of cold-rolled steel plates (JIS G3141, spec/SP, 25×100×1.6 mm) was preheated to 130° C. The polyimide film was inserted between the steel plates and pressed at 350° C. for 5 minutes under a pressure of 50 kg/cm$^2$ to obtain a specimen. The specimen had a tensile shear adhesive strength of 290 kg/cm$^2$ at room temperature and 220 kg/cm$^2$ at 220° C. in accordance with JIS K-6848 and −6850.

Comparative Example 1

A polyamic acid solution having an inherent viscosity of 0.56 dl/g was obtained by carrying out the same procedures as described in Example 1 except that the amount of pyromellitic dianhydride was changed from 16.57 g (0.076 mole) to 19.67 g (0.090 mole) and the amount of 3,3', 4,4'-biphenyltetracarboxylic dianhydride was changed from 5.59 g (0.019 mole) to 1.397 g (4.75×10$^{-3}$ mole). Using the polyamic acid solution thus obtained, a sheet of Kapton 200H was adhered with an Inconel foil by carrying out the same procedures as Example 1. The specimen thus obtained had a 180° peel strength of 0.15 kg/cm$^2$ at room temperature. The strength was very low as compared with that of Example 1.

Variation of the 180° peel strength was measured at the room temperature by the same procedures as Example 1. Results are summarized in FIG. 1.

Further, the above polyamic acid solution was cast on a glass plate and a polyimide film having a thickness of 30 μm was obtained by carrying out the same procedures as Example 1. The polyimide film had a glass transition temperature of 269° C.

Comparative Examples 2–4

Adhesives were prepared by carrying out the same procedures as described in Example 1 except that pyromellitic dianhydride and 3,3', 4,4'-biphenyltetracarboxylic dianhydride were used in amounts illustrated in Table 1, and 4,4'-diaminobenzophenone and 3,3', 4,4'-benzophenonetetracarboxylic dianhydride were used in Comparative Example 4. Properties of these adhesives were evaluated by the same procedures as Example 1 and results are illustrated in Table 1 and FIG. 1.

EXAMPLES 2–3

Polyamic acids were prepared by carrying out the same procedures as described in Example 1 except that tetracarboxylic acid dianhydrides were used as illustrated in Table 1. Specimens were prepared by the same procedures as Example 1 and the 180° peel strength was measured at the room temperature and 220° C. Glass transition temperature of polyimide films was measured. Results are illustrated together with Example 1 and Comparative Examples 1-3. These adhesives had excellent peel strength and heat-resistance as compared with Comparative Example 1.

The specimen had a 180° peel strength of 2.5 kg/cm² at the room temperature and 2.0 kg/cm² at 220° C.

TABLE 1

| | Diamine g (mole) | Tetracarboxylic acid dianhydride g (mole) | Ratio; PMDA*¹/ tetracarboxylic acid dianhydride (mole %) | Polyamic acid inherent viscosity (dl/g) | Glass transition temperature (°C.) | 180° Peel strength (kg/cm) room temperature | 180° Peel strength (kg/cm) 220° C. |
|---|---|---|---|---|---|---|---|
| Example 1 | BAPB*⁴ 36.8 (0.1) | PMDA*¹ 16.57 (0.076) BPDA*² 5.59 (0.019) | 80 | 0.54 | 268 | 2.4 | 1.9 |
| Example 2 | ↑ | PMDA 10.36 (0.0475) BPDA 13.97 (0.0475) | 50 | 0.55 | 261 | 2.4 | 2.0 |
| Example 3 | ↑ | PMDA 4.14 (0.019) BPDA 22.34 (0.076) | 20 | 0.55 | 255 | 2.1 | 1.9 |
| Comparative Example 1 | ↑ | PMDA 19.67 (0.090) BPDA 13.97 (0.0475) | 95 | 0.58 | 269 | 0.15 | 0.07 |
| Comparative Example 2 | ↑ | PMDA 20.71 (0.095) BPDA 0 (—) | 100 | 0.58 | 270 | 0.12 | 0.05 |
| Comparative Example 3 | ↑ | PMDA 0 (—) BPDA 27.93 (0.095) | 0 | 0.54 | 243 | 1.8 | 1.3 |
| Comparative Example 4 | DAB*⁵ 21.2 (0.1) | BTDA*³ 30.59 (0.095) | — | 0.47 | 269 | 0.05 | 0.01 |
| Example 4 | BAPB 36.8 (0.1) | PMDA 16.92 (0.078) BPDA 5.70 (0.0194) | 80 | 0.75 | 269 | 2.5 | 2.1 |

Note:
*¹PMDA; Pyromellitic dianhydride
*²BPDA; 3,3',4,4'-Biphenyltetracarboxylic dianhydride
*³BTDA; 3,3',4,4'-Benzophenonetetracarboxylic dianhydride
*⁴BAPB; 4,4'-Bis(3-aminophenoxy)biphenyl
*⁵DAB; 3,3'-Diaminobenzophenone

EXAMPLE 4

A N,N-dimethylacetamide varnish of polyamic acid having an inherent viscosity of 0.54 dl/g was obtained by carrying out the same procedures as described in Example 1. To the varnish, 30.6 g (0.3 mole) of acetic anhydride and 20.2 g (0.2 mole) of triethylamine were added and stirred at 80° C. for 4 hours. The reaction mixture was poured into 1000 g of methyl ethyl ketone. The precipitated yellow polyimide powder was washed with 1000 g of methyl ethyl ketone and dried at 200° C. for 8 hours under reduced pressure. The polyimide powder thus obtained had an inherent viscosity of 0.53 dl/g at 35° C. in a 5 % p-chlorophenol/phenol (9/1 by weight) solvent mixture and a glass transition temperature of 267° C. The polyimide powder was placed on a sheet of Kapton 200H and an Inconel foil of 20 μm in thickness was superposed and pressed at 350° C. for 10 minutes under pressure of 100 kg/cm².

The adhesive thus applied had a thickness of 25 μm. The specimen had a 180° peel strength of 2.3 kg/cm² at room temperature and 1.8 kg/cm² at 220° C.

EXAMPLE 5

A mixture of 10 g of polyimide powder obtained in Example 4 and 90 g of m-cresol was heated to 160° C. with stirring and stirring was continued for an hour to completely dissolve the polyimide powder. The varnish thus obtained was applied to a sheet of Kapton 200H which had previously been washed with ethanol, and dried at 200° C. for 2 hours in the air. Successively an Inconel foil having a thickness of 20 μm was overlapped on the coated surface of the sheet and pressed at 350° C. for 10 minutes under pressure of 100 kg/cm².

The coated adhesive had a thickness of 25 μm.

What is claimed is:

1. A heat-resistant adhesive essentially consisting of a polyimide comprising in a polymer molecule from 10 to 99% by mole of structural units having the formula (1):

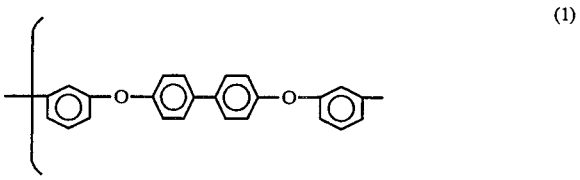

(1)

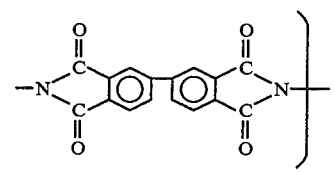

and from 1 to 90% by mole of structural units having the formula (2):

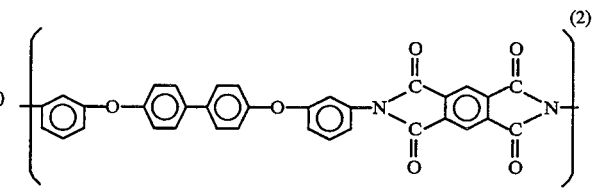

(2)

2. A polyimide-based heat-resistant adhesive essentially consisting of a polyamic acid comprising in a polymer molecule from 10 to 99% by mole of structural units having the formula (3):

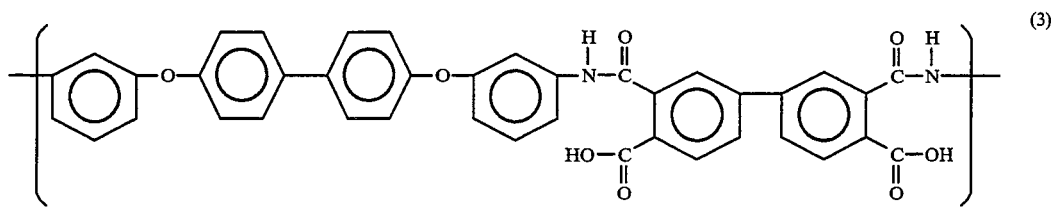

and from 1 to 90% by mole of structural units having the formula (4):

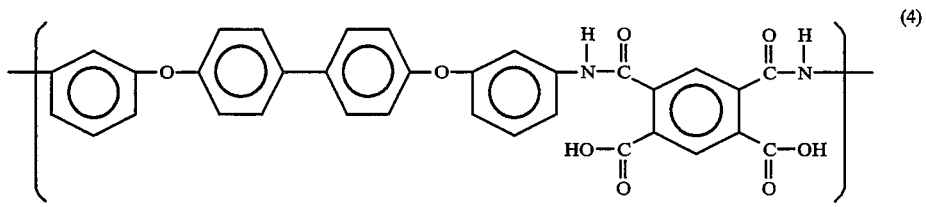

and a varnish comprising said polyamic acid.

3. The heat-resistant adhesive of claim 2 wherein the polyamic acid which is dissolved in N,N-dimethylacetamide to a concentration of 0.5 g/100 ml gives an inherent viscosity of from 0.1 to 3.0 dl/g at 35° C.

4. A heat-resistant adhesive essentially consisting of a polyimide obtained by thermally or chemically imidizing a polyamic acid comprising in a polymer molecule from 10 to 99% by mole of structural units having the formula (3):

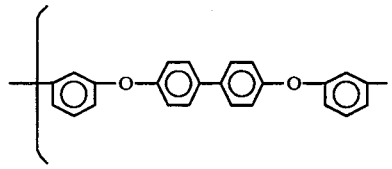

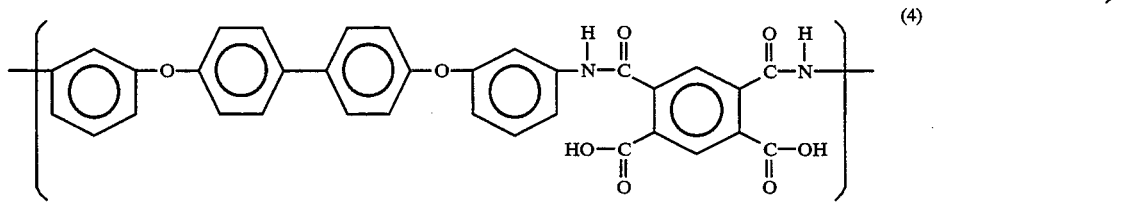

and from 1 to 90% by mole of structural units having the formula (4):

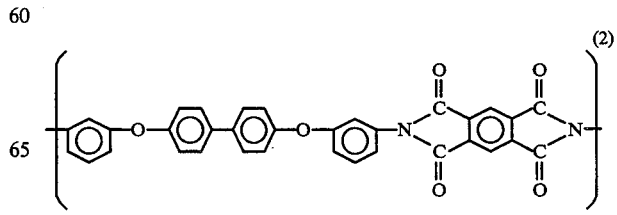

said polyamic acid having an inherent viscosity of from 0.1 to 3.0 dl/g which is measured at 35° C. by dissolving said polyamic acid in N,N-dimethylacetamide to a concentration of 0.5 g/100 ml.

5. A heat-resistant adhesive consisting essentially of a polyimide comprising from 20 to 70% by mole of structural units having the formula (1):

and from 30 to 80% by mole of structural units having the formula(2):

6. A polyimide-based heat-resistant adhesive consisting essentially of a polyamic acid comprising from 20 to 70% by mole of structural units having the formula (3):
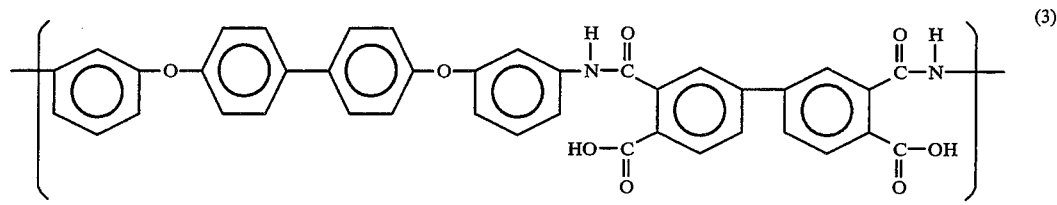
and from 30 to 80% by mole of structural units having the formula (4)
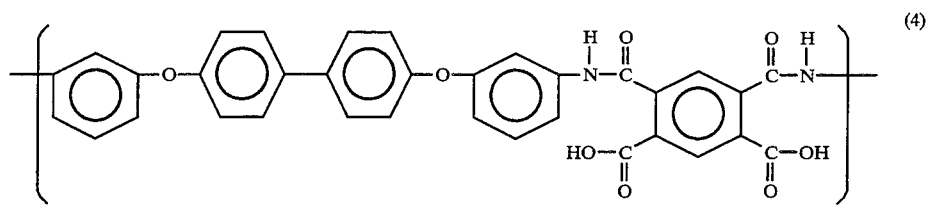
and a varnish comprising said polyamic acid.
* * * * *